Oct. 13, 1959   A. E. STURZENEGGER   2,908,833
POLE FORM FOR EDDY-CURRENT CLUTCHES AND THE LIKE
Filed June 17, 1957
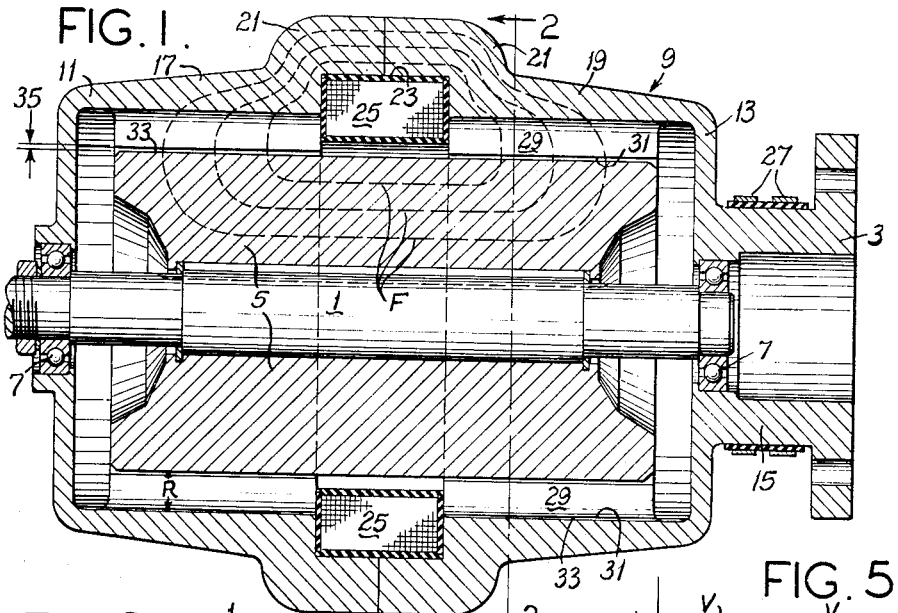
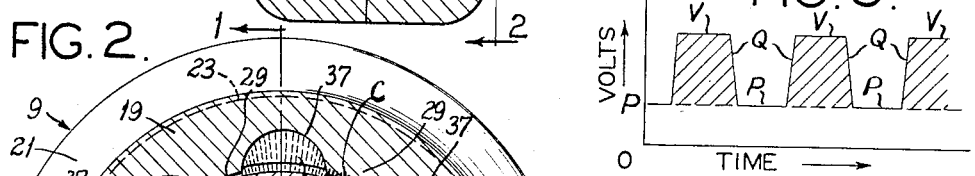
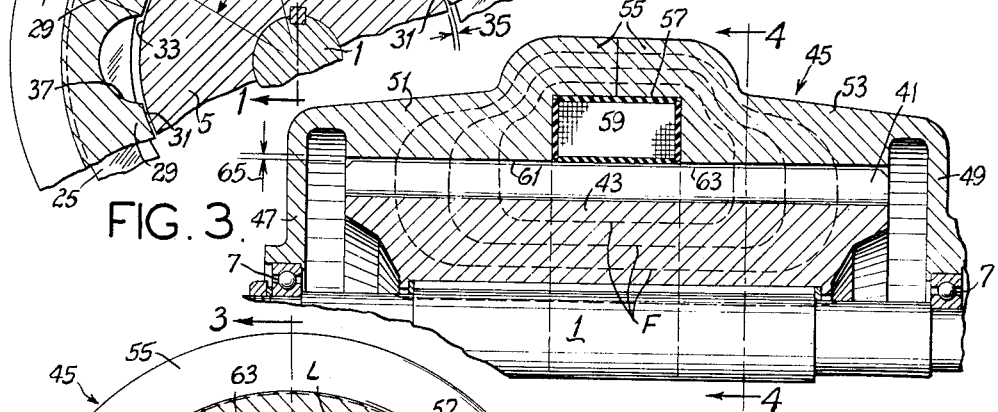
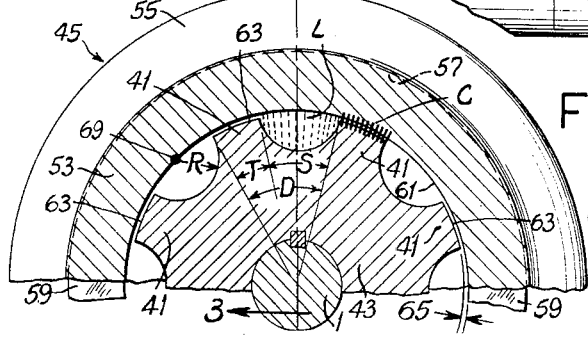
Alfred E. Sturzenegger,
Inventor.
Koenig and Pope,
Attorneys.

United States Patent Office 2,908,833
Patented Oct. 13, 1959

2,908,833

POLE FORM FOR EDDY-CURRENT CLUTCHES AND THE LIKE

Alfred E. Sturzenegger, Kenosha, Wis., assignor to Eaton Manufacturing Company, Cleveland, Ohio, a corporation of Ohio Application June 17, 1957, Serial No. 666,077

2 Claims. (Cl. 310—105)

This invention relates to eddy-current clutches and the like, and with regard to certain more specific features, to improved pole forms therefor.

Among the several objects of the invention may be noted the provision of a pole form for eddy-current clutches and the like which minimizes the amount of leakage flux traversing the gaps between poles while maximizing the flux concentration traversing the gap at the pole faces; the provision of a pole form of the class described which produces a maximum rate of change of flux in the inductor member of the clutch at a given slip speed, whereby there is produced a highly efficient magnetic coupling action resulting in a large tangential driving force per unit area of pole face; and the provision of a pole form of the class described which is simple to design and fabricate in any size of clutch or the like. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section of an eddy-current clutch embodying one form of the invention, being viewed on line 1—1 of Fig. 2;

Fig. 2 is a cross section taken on line 2—2 of Fig. 1, the view being fragmentary;

Fig. 3 is a fragmentary axial section like Fig. 1 but showing another form of the invention, being viewed from line 3—3 of Fig. 4;

Fig. 4 is a cross section taken on line 4—4 of Fig. 3; and,

Fig. 5 is a graph illustrating the voltage developed in the inductor member of a clutch embodying the invention.

Corresponding reference characters indicate corresponding parts throughout the several views of the drawings.

The invention is applicable to eddy-current clutches, couplings and brakes, including dynamometers. In order to avoid circumlocution, all of these will be referred to below as clutches, since in each the general object is to obtain a clutching action between a driving and a driven member, whether or not the latter is rotatable or locked against rotation. The term clutch as used in the claims is also to be taken as synonymous with the terms coupling, brake or dynamometer.

Referring now more particularly to Figs. 1 and 2, there is shown at numeral 1 a drive shaft and at numeral 3 a flanged driven member. As will be apparent, the driving and driven relationship between these parts may be reversed. Keyed to the drive shaft 1 is a smooth ferromagnetic cylindrical drum 5, hereinafter to be referred to as an inductor rotor or drum. On the shaft 1 are bearings 7 which support a field member 9 which is in the form of a drum. The member 9 is constituted by end bell portions 11 and 13, the latter being connected with the flange 3 by means of a sleeve 15. The end bells 11 and 13 are connected by tapering sleeves 17 and 19 which are connected by an enlarged ring 21. The portions 17, 19 and 21 are ferromagnetic. Within the ring 21 is an annular recess 23 of rectangular cross section. In this recess 23 is located an annular field coil 25 which may be variably excited through suitable wires (not shown) connecting it with insulated slip rings 27 carried on the sleeve 15. Upon exciting this coil 25, a toroidal flux field is established in the upper half of Fig. 1, such as indicated diagrammatically at F. The shape of this field F is idealized and it will be understood that there are actually more lines of magnetomotive force than those indicated.

Formed integrally with and extending inward from the members 17 and 19 are axially directed ferromagnetic poles 29 having inner faces 31 of hollow cylindric form spaced a small distance from the outer solid cylindric surface 33 of the inductor member 5. Thus, small magnetic gaps 35 are provided between the inner cylindric pole faces 31 and the outer cylindric surface 23 of the inductor 5. The gaps are on the order of .020" across.

The forms of the poles 29 are determined by the forms of the spaces 37 between them, these forms being the particular subject of the invention. As shown in Fig. 2, these spaces are circular, having radii R centered on the outer cylindric face of the inductor 5, as indicated at virtual center 39. The number of teeth employed is variable, depending upon the radius from the center line of the machine selected for the gap 35 and upon the pole width W; also upon the ratios of the angles S and T, which respectively subtend the space and pole widths, as shown in Fig. 2. The sum D of these angles is the circular pitch distance occupied by the sum of one pole and one space width considered in a peripheral direction. This pitch distance D may also be defined as the distance between corresponding peripheral points on adjacent poles. The ratio of $$\frac{T}{D}$$

is preferably ⅓ or 33⅓%, but may range from 28% to 40% inclusive. The ratio of $$\frac{1}{3}$$

is preferred, as in the example shown, wherein there are eight teeth and eight spaces, or eight pitch distances. It is preferable that the area of ferromagnetic cross section of the inner member 5 within the coil 25 shall be on the order of 80% of the ferromagnetic cross-sectional area of the outer member 9 outside of the coil 25. This is for the purpose of maintaining saturation throughout the magnetic path around the coil, taking flux leakage into account. A suggested range for this figure is 75% to 90%. It will be noted that the ratio $$\frac{I}{D}=\frac{1}{3}$$

is tantamount to the relation $W=R$, approximately.

Operation is as follows:

The toroidal field F interlinking members 5 and 9 has a nonhomogeneous peripheral distribution of flux at the pole faces 31, hereinafter referred to as flux concentration such as shown at C. However, there will be a tendency for some leakage of flux to the inductor 5 across the larger gaps established by the spaces between poles. The more of this leakage there is, the less driving torque can be obtained because torque is a function of the rate of change of flux concentrations that sweep through the inductor S, and this rate of flux change is reduced as the leakage to the inductor between poles is increased.

To understand the action better, consider a pole 29 with a high flux concentration passing from it across the gap 35, as indicated by the solid lines C in Fig. 2. As concentrations such as this concentration C move through the inductor, eddy currents are engendered therein which cause a reactive flux field with respect to the field concentrations. This reaction is that which is responsible for the driving torque obtained. Any leakage of flux that occurs across the spaces 37 will be as shown by the dotted lines L in Fig. 2. The maximum voltage occurring at any given point in the inductor 5 changes with time as the flux varies, which is as shown by the upper levels V in the Fig. 5 chart. The minimum voltage ideally would be zero, but actually there is always some parasitic action which prevents this, resulting in a minimum voltage greater than zero. This is generally referred to as the suppressed value of eddy-current voltage indicated at P in Fig. 5. It is an object to have the suppressed value P as low as possible relative to the maximum value V (although it can never be zero) and also to have the time rate of change of voltage between the maximum V and the minimum P as rapid as possible. The rapidity with which this voltage changes is shown by the steep slopes Q in Fig. 5, the ideal of which would be a vertical line.

That which I have discovered is that a circular form for the space 37 between the poles 29, centered on or near the inductor surface, the ratio of pole to space width being substantially according to the ratio $$\frac{T}{S}$$

above given, results in an extremely low suppressed inductor voltage value P, an extremely high maximum voltage value V and an extremely rapid rate of voltage change Q, all as shown in Fig. 5. The result of the construction is that clutches, couplings and brakes may be built with tangential torque producing forces at the pole faces in excess of 40 p.s.i. of pole face, a very unusual performance.

Moreover, the circular form is convenient to design and manufacture, even in the case of high-speed slip clutches which may be required to be formed with forged or rolled steel rotors. These can be made readily by drilling holes through drums with initially thick walls, then boring the drums out to remove the inner portions of the material across the holes, leaving the practically semicircular remainders of the holes as spaces between poles, the poles themselves being thus automatically formed. Of course for lower-speed machines, the rotor having the poles may be cast and the space between teeth circularly cored out, or other methods of manufacture may be employed.

Figs. 3 and 4 show a form of the invention in which an inversion has been made, namely, the poles 41 (corresponding to poles 29 in Fig. 2) are located axially on the inner member 43 keyed to the drive shaft 1. The shaft again carries the bearings 7 for an outer field member 45 (the latter corresponding to the member 9 in Fig. 1, except for the absence of poles thereon). This member 45 has end bells 47 and 49, carrying tapering sleeves 51 and 53, joined by a ring portion 55 having an annular recess 57 in which is carried the annular field coil 59. In this case the inside of the field coil may be flush with the inside of the member 45, which is smoothly cylindric as shown at 61. Between the pole ends 63 and the inner cylindric surface 61 is the magnetic gap 65. In this case again the spaces 67 between the poles 41, which determine the pole forms are circles, have radii R centered substantially on or near the inner cylindric face of member 45, as shown at 69. Again T represents the angle subtended by the pole face, S the angle subtended by the space width, and D the pitch distance subtended by the sum of one pole and one space width in a peripheral direction. The relations between S, D and T, above specified in connection with the Figs. 1 and 2 form of the invention, apply to the form shown in Figs. 3 and 4. Also in this case the ferromagnetic cross section of the pole-forming member 43 should be on order of 80% of the cross section of the member 45 in the ring 55 outside of the coil 59.

Operation of the form of the invention shown in Figs. 3 and 4 is similar to that already described in connection with the form of Figs. 1 and 2. A typical shape of the toroidal magnetic field is again shown at F. Flux concentration across the gap 65 at a pole end is shown at C, and the attenuated leakage flux by the dotted lines at L. In this case the flux concentrations such as C effected by the teeth 41 sweep the inner smooth cylindric surface 61 of the field member 45, generating the eddy currents therein which produce the reactive flux field, which in turn generates the tangential driving force to provide torque.

In both forms of the invention there results the steep-stepped voltage curve such as shown in Fig. 5, wherein the tops and bottoms of the steps are substantially flat and the sides are near to vertical, and wherein the energy absorbed is indicated by the cross-hatched area enveloped by the curve and the suppressed voltage line P. It may be mentioned that any deviation from a circular form of interpole space has a radical effect upon the form of the curve shown in Fig. 5, such as lowering the maximum voltage V, raising the suppressed minimum voltage P, and reducing the steepness of lines Q, any or all of which reduce the cross-hatched areas representing energy transferred by torque.

From what is known in the eddy-current clutch art, it is clear that either of the coils 25 or 59 might be located on the inner member 5 or 43, as the case may be; also that the coil may be mounted on a separate stationary element in such a position that its toroidal flux field interlinks both of the elements 5, 9 (in the case of Fig. 1) or 43 and 45 (in the case of Figs. 3 and 4). The equivalence in this regard may be noted from the showing in United States Patent 2,106,542 of A. Winther, dated January 25, 1938.

The driving or driven member 9 or 45 having poles thereon with respect to which the magnetic flux field concentrations do not move may be referred to as stators. The term rotor is synonymous with the term inductor, and is defined as the circularly smooth member such as 5 or 43, in regard to which the flux concentrations produced by the poles move relatively.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An eddy-current clutch comprising driving and driven members which are relatively rotatable on a common axis, each of said members being of generally cylindric shape closely adjacent to the cylindric shape of the other adapted to provide gap means therebetween on a single diameter, one of said cylindric members being peripherally continuous and the other member being peripherally toothed and both members being ferromagnetic throughout their portions adjacent said gap means, said peripherally continuous member being an inductor member and the toothed member being a polar member on which the teeth are poles, an annular field coil located on one of the members in a position in which portions of the poles extend axially on opposite sides thereof, said coil being adapted to be excited to produce a toroidal flux field interlinking said members and passing through said poles and across said single-diametered gap once on each side of said coil, said discontinuous cylindric shape of the polar member being formed by substantially axially directed spaces between and determining the shapes of the toothed poles of the polar member, said spaces being constituted by elongate troughs which are substantially semicircular in cross section, the axes of which are located substantially at said gap means.

2. An eddy-current clutch of the type set forth in claim 1, wherein the ratio of the angle subtending the peripherally disposed margins of the resulting toothed poles near the inductor surface to the angle subtending the pitch distance between corresponding points on adjacent toothed poles is in the range from 28% to 40%, inclusive.

References Cited in the file of this patent
UNITED STATES PATENTS

| | | |
|---|---|---|
| 2,119,819 | List | June 7, 1938 |
| 2,367,163 | Winther | Jan. 9, 1945 |
| 2,679,604 | Jaeschke | May 25, 1954 |

UNITED STATES PATENT OFFICE
Certificate of Correction

Patent No. 2,908,833                                           October 13, 1959

Alfred E. Sturzenegger

It is hereby certified that error appears in the printed specification of the above numbered patent requiring correction and that the said Letters Patent should read as corrected below.

Column 2, lines 61 and 62, for $$\frac{I}{D}=\frac{1}{3} \quad \text{read} \quad \frac{T}{D}=\frac{1}{3}$$

Signed and sealed this 3rd day of May 1960.

[SEAL]

Attest:
KARL H. AXLINE,
*Attesting Officer.*

ROBERT C. WATSON,
*Commissioner of Patents.*